US012484634B2

(12) United States Patent
Jung et al.

(10) Patent No.: US 12,484,634 B2
(45) Date of Patent: Dec. 2, 2025

(54) AEROSOL GENERATING DEVICE HAVING A SMOKE MODE AND A SMOKELESS MODE

(71) Applicant: KT&G CORPORATION, Daejeon (KR)

(72) Inventors: Sun Hwan Jung, Daejeon (KR); Sung Hoon Ha, Daejeon (KR); Chan Min Kwon, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 684 days.

(21) Appl. No.: 17/299,130

(22) PCT Filed: Feb. 22, 2021

(86) PCT No.: PCT/KR2021/002181
§ 371 (c)(1),
(2) Date: Jun. 2, 2021

(87) PCT Pub. No.: WO2021/256659
PCT Pub. Date: Dec. 23, 2021

(65) Prior Publication Data

US 2023/0346044 A1 Nov. 2, 2023

(30) Foreign Application Priority Data

Jun. 16, 2020 (KR) ........................ 10-2020-0073236

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/20* (2020.01); *A24F 40/30* (2020.01);
(Continued)

(58) Field of Classification Search
CPC .......... A24F 40/10; A24F 40/20; A24F 40/30; A24F 40/46; A24F 40/51; A24F 40/57; A24F 40/60; H05B 1/023
See application file for complete search history.

(56) References Cited

U.S. PATENT DOCUMENTS 4,774,894 A * 10/1988 Burton .................... F23G 7/105 110/259
5,878,752 A * 3/1999 Adams .................. A24F 40/465 131/194
(Continued)

FOREIGN PATENT DOCUMENTS

CN 104159458 A 11/2014
CN 110693096 A 1/2020
(Continued)

OTHER PUBLICATIONS

Office Action issued Jan. 18, 2022 in Korean Application No. 10-2020-0073236.
(Continued)

*Primary Examiner* — Hae Moon Hyeon
(74) *Attorney, Agent, or Firm* — Sughrue Mion, PLLC

(57) ABSTRACT

An aerosol generating device includes a cartridge configured to store an aerosol generating material, a main body to which the cartridge is detachably coupled, a first heater configured to heat a cigarette inserted into the aerosol generating device, a second heater configured to heat an aerosol generating material, and a processor configured to individually control the first heater and the second heater so that the aerosol generating device operates in one of a smokeless mode in which visible smoke is not generated and a smoke mode in which visible smoke is generated.

12 Claims, 10 Drawing Sheets

(51) Int. Cl.
*A24F 40/20* (2020.01)
*A24F 40/30* (2020.01)
*A24F 40/46* (2020.01)
*A24F 40/51* (2020.01)
*A24F 40/60* (2020.01)
*H05B 1/02* (2006.01)

(52) U.S. Cl.
CPC .............. *A24F 40/46* (2020.01); *A24F 40/51* (2020.01); *A24F 40/60* (2020.01); *H05B 1/023* (2013.01)

(56) References Cited

U.S. PATENT DOCUMENTS

| | | | | |
|---|---|---|---|---|
| 9,833,019 | B2 * | 12/2017 | Ampolini | A61M 11/042 |
| 10,081,531 | B2 * | 9/2018 | Murison | B67D 7/42 |
| 11,571,019 | B2 * | 2/2023 | Murison | B67D 7/0288 |
| 11,723,413 | B2 * | 8/2023 | Qiu | A24F 40/53 128/202.21 |
| 2004/0159259 | A1 * | 8/2004 | Walker | F42B 4/00 102/335 |
| 2007/0074734 | A1 * | 4/2007 | Braunshteyn | A24F 13/00 131/194 |
| 2014/0000638 | A1 * | 1/2014 | Sebastian | A24F 40/30 131/328 |
| 2014/0069424 | A1 * | 3/2014 | Poston | A61M 15/06 128/202.21 |
| 2014/0305454 | A1 * | 10/2014 | Rinker | A24F 40/46 131/329 |
| 2015/0101606 | A1 * | 4/2015 | White | A61M 15/00 131/194 |
| 2015/0136159 | A1 * | 5/2015 | Seo | A24D 3/048 131/331 |
| 2015/0196060 | A1 * | 7/2015 | Wensley | A61M 15/002 392/404 |
| 2015/0216237 | A1 * | 8/2015 | Wensley | A24F 40/48 131/273 |
| 2016/0157524 | A1 * | 6/2016 | Bowen | H05B 1/0244 702/50 |
| 2017/0119058 | A1 * | 5/2017 | Cameron | A24B 15/167 |
| 2017/0334605 | A1 * | 11/2017 | Murphy | F01N 13/1805 |
| 2017/0360104 | A1 * | 12/2017 | Hu | A24F 40/50 |
| 2018/0043114 | A1 * | 2/2018 | Bowen | A61M 11/042 |
| 2018/0132526 | A1 * | 5/2018 | Davis | H05B 1/0244 |
| 2018/0168223 | A1 * | 6/2018 | Zinovik | A24F 40/51 |
| 2018/0295881 | A1 * | 10/2018 | Mironov | A24F 40/70 |
| 2018/0303161 | A1 * | 10/2018 | Bilat | A24B 15/167 |
| 2019/0124982 | A1 * | 5/2019 | Atkins | A24F 40/30 |
| 2019/0208815 | A1 * | 7/2019 | Thorsen | A24F 40/46 |
| 2019/0274354 | A1 * | 9/2019 | Sur | A24F 40/50 |
| 2019/0313698 | A1 * | 10/2019 | Kuczaj | H05B 1/0244 |
| 2019/0335820 | A1 * | 11/2019 | Watanabe | A24F 40/42 |
| 2019/0350256 | A1 * | 11/2019 | Hejazi | A24F 40/44 |
| 2019/0357597 | A1 * | 11/2019 | Watanabe | A61M 11/044 |
| 2020/0000143 | A1 * | 1/2020 | Anderson | G06F 18/22 |
| 2020/0037668 | A1 * | 2/2020 | Robert | A24F 40/50 |
| 2020/0086068 | A1 * | 3/2020 | Lee | A24B 15/16 |
| 2020/0093177 | A1 * | 3/2020 | Han | A61M 11/042 |
| 2020/0120992 | A1 * | 4/2020 | Fang | H04W 4/021 |
| 2020/0154766 | A1 * | 5/2020 | Jeong | A24F 40/30 |
| 2020/0345066 | A1 | 11/2020 | Kim et al. | |
| 2020/0368462 | A1 * | 11/2020 | Lee | H05B 1/0244 |
| 2021/0068454 | A1 * | 3/2021 | Jung | A24F 40/46 |
| 2021/0145073 | A1 * | 5/2021 | Lee | A24F 40/50 |
| 2024/0225126 | A1 * | 7/2024 | Park | A24F 40/46 |
| 2024/0225127 | A1 * | 7/2024 | Park | A24F 40/57 |
| 2024/0237734 | A1 * | 7/2024 | Park | A24F 40/30 |
| 2024/0298697 | A1 * | 9/2024 | Kwon | A24D 3/17 |
| 2024/0398004 | A1 * | 12/2024 | Lee | A24F 40/465 |

FOREIGN PATENT DOCUMENTS

| | | | |
|---|---|---|---|
| CN | 110891808 | A | 3/2020 |
| CN | 111011928 | A | 4/2020 |
| CN | 111248508 | A | 6/2020 |
| EP | 3170413 | A1 | 5/2017 |
| EP | 3 832 013 | A1 | 6/2021 |
| JP | 2018-174802 | A | 11/2018 |
| JP | 2019-41736 | A | 3/2019 |
| KR | 10-1314895 | B1 | 10/2013 |
| KR | 10-2014-0046022 | A | 4/2014 |
| KR | 10-2016-0112769 | A | 9/2016 |
| KR | 10-2017-0111266 | A | 10/2017 |
| KR | 10-2019-0011264 | A | 2/2019 |
| KR | 10-2019-0051745 | A | 5/2019 |
| KR | 10-2020-0057487 | A | 5/2020 |
| WO | 2020/026311 | A1 | 2/2020 |
| WO | 2020/101206 | A1 | 5/2020 |
| WO | 2020/101213 | A1 | 5/2020 |
| WO | 2020/101258 | A1 | 5/2020 |

OTHER PUBLICATIONS

Extended European Search Report issued Dec. 17, 2021 in European Application No. 21728151.8.

International Search Report issued Jun. 9, 2021 in International Application No. PCT/KR2021/002181.

Chinese Office Action dated Apr. 4, 2023 in Chinese Application No. 202180005252.1.

* cited by examiner

AEROSOL GENERATING DEVICE HAVING A SMOKE MODE AND A SMOKELESS MODE

CROSS REFERENCE TO RELATED APPLICATIONS

This application is a National Stage of International Application No. PCT/KR2021/002181 filed Feb. 22, 2021, claiming priority based on Korean Patent Application No. 10-2020-0073236 filed Jun. 16, 2020.

TECHNICAL FIELD

The present disclosure relates to an aerosol generating device and an operating method of the same.

BACKGROUND ART

Recently, the demand for alternative methods to overcome the disadvantages of traditional aerosol generating article has increased. For example, there is growing demand for an aerosol generating device which generates aerosol by heating an aerosol generating material in aerosol generating articles, rather than by combusting aerosol generating articles.

On the other hand, if no visible smoke is generated when an aerosol generating device is used, there is an advantage in that a user can use the aerosol generating device without restriction of place or environment, and if visible smoke is generated, visual satisfaction is provided to the user. Thus, there is a need for a technology that allows the user to select one of smokeless smoking and smoke smoking in consideration of the advantages of smokeless smoking and smoke smoking.

DESCRIPTION OF EMBODIMENTS

Technical Problem

Various embodiments may provide an aerosol generating device and an operating method of the same. Specifically, various embodiments may provide a device for individually controlling a first heater and a second heater to operate in one of a smokeless mode and a smoke mode. The technical problems of the present disclosure are not limited to the aforementioned description, and other technical problems may be derived from the embodiments described hereinafter.

Solution to Problem

According to an aspect of the present disclosure, an aerosol generating device includes a cartridge configured to store an aerosol generating material, a main body to which the cartridge is detachably coupled, a first heater configured to heat a cigarette inserted into the aerosol generating device, a second heater configured to heat an aerosol generating material, and a processor configured to individually control the first heater and the second heater so that the aerosol generating device operates in one of a smokeless mode in which visible smoke is not generated and a smoke mode in which visible smoke is generated.

According to another aspect of the present disclosure, an operating method of an aerosol generating device, includes receiving a first user input for selecting one of a smokeless mode in which visible smoke is not generated from the aerosol generating device and a smoke mode in which visible smoke is generated from the aerosol generating device, detecting whether a cigarette is inserted into the aerosol generating device, and, when insertion of the cigarette is detected, individually controlling a first heater and a second heater based on a previously-selected mode, wherein the first heater heats the cigarette, and the second heater heats an aerosol generating material stored in a cartridge.

Advantageous Effects of Disclosure

In an aerosol generating device according to the present disclosure, whether or not to generate visible smoke is determined through individual control of a first heater and a second heater so that a user may use the aerosol generating device without restriction of place or environment, thereby providing convenience to the user. The effects of the present disclosure are not limited to the above-described effects, and effects that are not mentioned will be clearly understood by those of ordinary skill in the art from the present specification and the accompanying drawings.

BEST MODE

Figure 1:
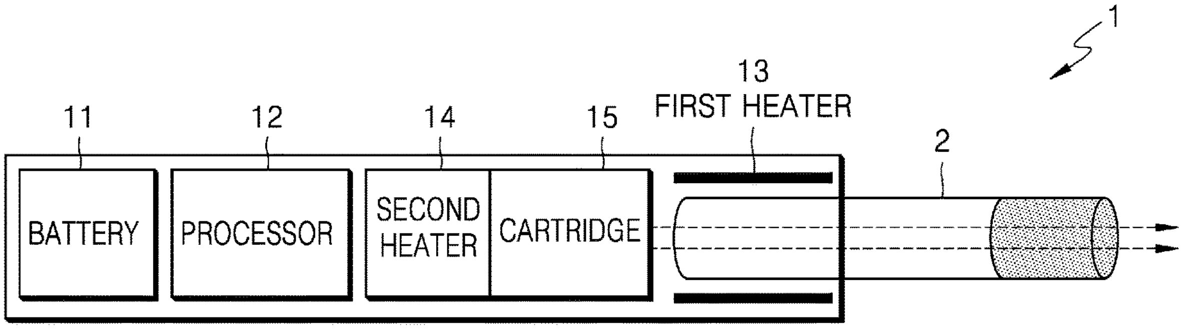
FIGS. 1 and 2 are views illustrating examples in which a cigarette is inserted into an aerosol generating device.

According to an aspect of the present disclosure, an aerosol generating device includes an aerosol generating device includes a cartridge configured to store an aerosol generating material, a main body to which the cartridge is detachably coupled, a first heater configured to heat a cigarette inserted into the aerosol generating device, a second heater configured to heat an aerosol generating material, and a processor configured to individually control the first heater and the second heater so that the aerosol generating device operates in one of a smokeless mode in which visible smoke is not generated and a smoke mode in which visible smoke is generated.

The processor may operate only the first heater among the first heater and the second heater in the smokeless mode.

The processor may control the first heater so that the cigarette is heated to a temperature less than a first temperature.

The processor may operate both the first heater and the second heater in the smoke mode.

The processor may heat the second heater so that the aerosol generating material is heated to a temperature equal to or higher than an evaporation point.

The processor may operate the first heater in the smoke mode and may control the first heater so that the cigarette is heated to a temperature equal to or higher than the first temperature.

The processor may operate only the second heater among the first heater and the second heater in the smoke mode and may control the second heater so that the aerosol generating material is heated to a temperature equal to or higher than the evaporation point.

The aerosol generating device may further include a user interface for selecting one of the smokeless mode and the smoke mode, and the processor may control the first heater and the second heater according to a previously-selected mode, in response to a third user input for generating an aerosol.

When the smokeless mode is selected, the user interface may receive a second user input for selecting one from among a plurality of temperature profiles within a first temperature range with respect to the first heater, and when the smoke mode is selected, the user interface may receive a second user input for selecting one from among a plurality of temperature profiles within a second temperature range with respect to the first heater and one from among a plurality of temperature profiles within a third temperature range with respect to the second heater, and the processor may control the first heater and the second heater according to the selected at least one temperature profile.

The aerosol generating device may further include a sensor configured to detect insertion of the cigarette, and the processor may detect insertion of the cigarette based on a signal generated by the sensor, and when insertion of the cigarette is detected, the processor may control the first heater and the second heater according to the previously-selected mode.

The processor may control the amount of nicotine provided to the user by individually controlling the first heater and the second heater.

According to another aspect of the present disclosure, an operating method of an aerosol generating device, includes receiving a first user input for selecting one of a smokeless mode in which visible smoke is not generated from the aerosol generating device and a smoke mode in which visible smoke is generated from the aerosol generating device, detecting whether a cigarette is inserted into the aerosol generating device, and, when insertion of the cigarette is detected, individually controlling a first heater and a second heater based on a previously-selected mode, wherein the first heater heats the cigarette, and the second heater heats an aerosol generating material stored in a cartridge.

The controlling may include operating only the first heater among the first heater and the second heater when the smokeless mode is selected, and operating both the first heater and the second heater when the smoke mode is selected.

The receiving of the first user input may include, when the smokeless mode is selected, receiving a second user input for selecting one from among a plurality of temperature profiles within a first temperature range with respect to the first heater, when the smoke mode is selected, and receiving a second user input for selecting one from among a plurality of temperature profiles within a second temperature range with respect to the first heater and one from among a plurality of temperature profiles within a third temperature range with respect to the second heater, and the controlling may include controlling the first heater and the second heater according to the selected at least one temperature profile.

MODE OF DISCLOSURE

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

As used herein, terms including an ordinal number such as “first” or “second” may be used to describe various components, but the components should not be limited by the terms. The terms are used only for the purpose of distinguishing one component from other components.

Hereinafter, embodiments of the present disclosure will be described in detail with reference to the drawings.

Figure 2:
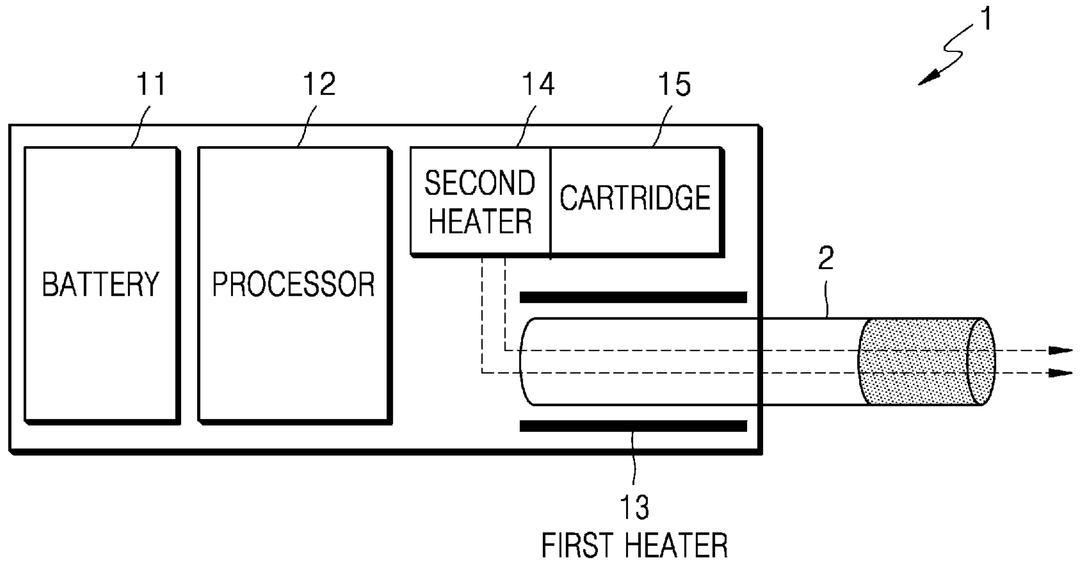

FIGS. 1 and 2 are diagrams showing examples in which a cigarette is inserted into an aerosol generating device.

Referring to FIGS. 1 and 2, an aerosol generating device 1 includes a battery 11, a processor 12, a first heater 13, a second heater 14, and a cartridge 15. Also, a cigarette 2 may be inserted into an internal space of the aerosol generating device 1.

FIGS. 1 and 2 illustrate only components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 and 2.

FIG. 1 illustrates that the battery 11, the processor 12, the first heater 13, the second hearer 14, and the cartridge 15 are arranged in a line. Also, FIG. 2 illustrates that the first heater 13 and the second heater 14 are arranged in parallel, and the second heater 14 and the cartridge 15 are arranged in a line. However, the internal structure of the aerosol generating device 1 is not limited to the structures illustrated in FIGS.

1 and 2. In other words, according to a design of the aerosol generating device 1, the arrangement of the battery 11, the processor 12, the first heater 13, the second heater 14, and the cartridge 15 may be changed.

When the cigarette 2 is inserted into the aerosol generating device 1, the aerosol generating device 1 may operate the first heater 13 and/or the second heater 14 to generate aerosol. The aerosol generated by the first heater 13 and/or the second heater 14 is delivered to the user by passing through the cigarette 2.

As needed, even when the cigarette 2 is not inserted into the aerosol generating device 1, the aerosol generating device 1 may heat the first heater 13 and the second heater 14.

The battery 11 may supply power to be used for the aerosol generating device 1 to operate. For example, the battery 11 may supply power to heat the first heater 13 or the second heater 14 and may supply power for operating the processor 12. Also, the battery 11 may supply power for operations of a display, a sensor, a motor, etc. mounted in the aerosol generating device 1.

The processor 12 may generally control operations of the aerosol generating device 1. In detail, the processor 12 may control not only operations of the battery 11, the first heater 13, and the second heater 14, but also operations of other components included in the aerosol generating device 1. Also, the processor 12 may check a state of each of the components of the aerosol generating device 1 to determine whether or not the aerosol generating device 1 is able to operate.

The processor 12 can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The first heater 13 may be heated by the power supplied from the battery 11. For example, when the cigarette is inserted into the aerosol generating device 1, the first heater 13 may be located outside the cigarette. Thus, the heated first heater 13 may increase a temperature of an aerosol generating material in the cigarette.

The first heater 13 may be an electro-resistive heater. For example, the first heater 13 may include an electrically insulating substrate (e.g., a substrate formed of polyimide) and an electrically conductive track, and the first heater 13 may be heated when currents flow along the electrically conductive track. However, the first heater 13 is not limited to the example described above and may include all heaters which may be heated to a desired temperature. Here, the desired temperature may be preset in the aerosol generating device 1 or may be set to a temperature wanted by a user.

As another example, the first heater 13 may include an induction heater. In detail, the first heater 13 may include an electrically conductive coil for heating a cigarette in an induction heating method, and the cigarette may include a susceptor which may be heated by the induction heater.

For example, the first heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of first heaters 13. Here, the plurality of first heaters 13 may be inserted into the cigarette 2 or may be arranged outside the cigarette 2. Also, some of the plurality of first heaters 13 may be inserted into the cigarette 2, and the others may be arranged outside the cigarette 2. In addition, the shape of the first heater 13 is not limited to the shapes illustrated in FIGS. 1 and 2 and may include various shapes.

The second heater 14 may generate an aerosol by heating a liquid composition (a second aerosol generating substrate) included in the cartridge 15, and the generated aerosol may pass through the cigarette 2 to be delivered to the user. In other words, the aerosol heated and generated by the second heater 14 may move along an air flow passage of the aerosol generating device 1, and the air flow passage may be configured such that the aerosol generated by the second heater 14 passes through the cigarette to be delivered to the user.

For example, the cartridge 15 may include a liquid storage and a liquid delivery element, but it is not limited thereto. For example, the second heater 14 and the cartridge 15 may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The cartridge 15 may be formed to be attached/detached to/from the second heater 14 or may be formed integrally with the second heater 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the second heater. For example, the liquid delivery element may be a wick such as cotton fiber, ceramic fiber, glass fiber, or porous ceramic, but is not limited thereto.

The second heater 14 heats the liquid composition delivered by the liquid delivery element. For example, the second heater 14 may be a metal heating wire, a metal hot plate, a ceramic heater, or the like, but is not limited thereto. In addition, the second heater 14 may include a conductive filament such as nichrome wire and may be positioned as being wound around the liquid delivery element. The second heater 14 may be heated by a current supply and may transfer heat to the liquid composition in contact with the heating element, thereby heating the liquid composition. As a result, aerosol may be generated.

For example, the second heater 14 and the cartridge 15 may be referred to as a cartomizer or an atomizer, but it is not limited thereto.

The aerosol generating device 1 may further include general-purpose components in addition to the battery 11, the processor 12, the first heater 13, the second heater 14, and the cartridge 15. For example, the aerosol generating device 1 may include a display capable of outputting visual information and/or a motor for outputting haptic information. Also, the aerosol generating device 1 may include at least one sensor (a puff detecting sensor, a temperature detecting sensor, a cigarette insertion detecting sensor, etc.). Also, the aerosol generating device 1 may be formed as a structure where, even when the cigarette 2 is inserted into the aerosol generating device 1, external air may be introduced or internal air may be discharged.

Although not illustrated in FIGS. 1 and 2, the aerosol generating device 1 and an additional cradle may form together a system. For example, the cradle may be used to charge the battery 11 of the aerosol generating device 1. Alternatively, the first heater 13 may be heated when the cradle and the aerosol generating device 1 are coupled to each other.

The cigarette 2 may be similar as a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1 or the entire first portion and a portion of the second portion may be inserted into the aerosol generating device 1. The user may puff aerosol while holding the second portion by the mouth of the user. In this case, the aerosol is generated by external air passing through the first portion, and the generated aerosol passes through the second portion and is delivered to the user's mouth.

For example, the external air may flow into at least one air passage formed in the aerosol generating device 1. For example, the opening and closing and/or a size of the air passage formed in the aerosol generating device 1 may be adjusted by the user. Accordingly, the amount of smoke and a smoking impression may be adjusted by the user. As another example, the external air may flow into the cigarette 2 through at least one hole formed in a surface of the cigarette 2.

Hereinafter, an example of the cigarette 2 will be described with reference to FIG. 3.

Figure 3:
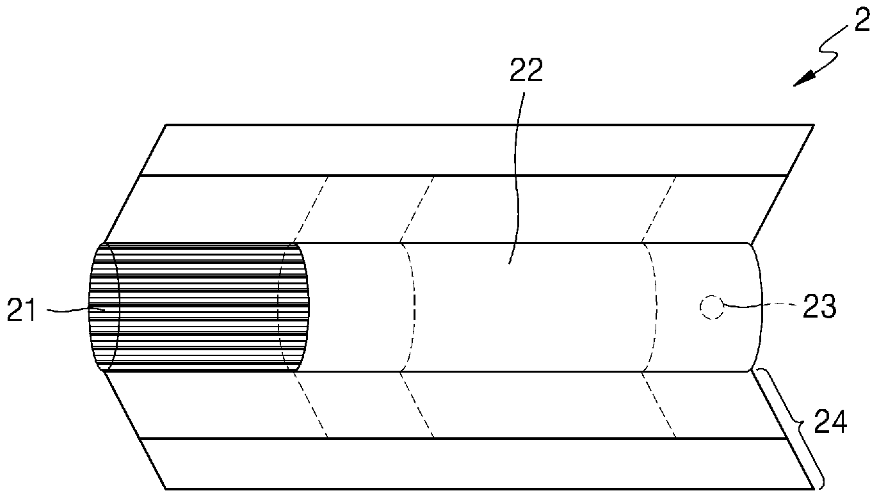
FIG. 3 is a view illustrating an example of a cigarette.

FIG. 3 illustrates an example of the cigarette.

Referring to FIG. 3, the cigarette 2 includes a tobacco rod 21 and a filter rod 22. The first portion described above with reference to FIGS. 1 and 2 may include the tobacco rod 21, and the second portion may include the filter rod 22.

FIG. 3 illustrates that the filter rod 22 includes a single segment, but is limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2 may be packaged by at least one wrapper 24. The wrapper 24 may have at least one hole through which external air may be introduced or internal air may be discharged. For example, the cigarette 2 may be packaged by one wrapper 24. As another example, the cigarette 2 may be doubly packaged by two or more wrappers 24. For example, the tobacco rod 21 may be packaged by a first wrapper, and the filter rod 22 may be packaged by a second wrapper. Also, the tobacco rod 21 and the filter rod 22, which are respectively packaged by separate wrappers, may be coupled to each other, and the entire cigarette 2 may be packaged by a third wrapper. When each of the tobacco rod 21 or the filter rod 22 is composed of a plurality of segments, each segment may be packaged by separate wrappers. Also, the entire cigarette 2 including the plurality of segments, which are respectively packaged by the separate wrappers and which are coupled to each other, may be re-packaged by another wrapper.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat conductive material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

The filter rod 22 may be formed to generate flavors. For example, a flavoring liquid may be injected onto the filter rod 22, or an additional fiber coated with a flavoring liquid may be inserted into the filter rod 22.

Also, the filter rod 22 may include at least one capsule 23. Here, the capsule 23 may perform a function of generating a flavor or an aerosol. For example, the capsule 23 may have a configuration in which a liquid containing a flavoring material is wrapped with a film. For example, the capsule 23 may have a spherical or cylindrical shape, but is not limited thereto.

When the filter rod 22 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Meanwhile, although not illustrated in FIG. 3, the cigarette 2 according to an embodiment may further include a front-end filter. The front-end filter may be located on one side of the tobacco rod 21 which is opposite to the filter rod 22. The front-end filter may prevent the tobacco rod 21 from being detached outwards and prevent the liquefied aerosol from flowing from the tobacco rod 21 into the aerosol generating device (1 of FIGS. 1 and 2), during smoking.

Figure 4:
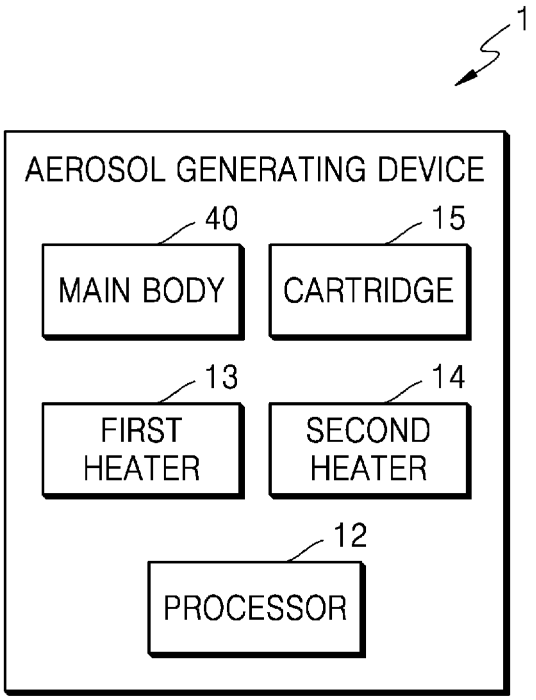
FIG. 4 is a block diagram showing the configuration of an aerosol generating device according to an embodiment.

FIG. 4 is a block diagram illustrating the configuration of an aerosol generating device according to an embodiment.

Referring to FIG. 4, an aerosol generating device 1 may include a processor 12, a first heater 13, a second heater 14, a cartridge 15, and a main body 40. The processor 12, the first heater 13, the second heater 14, and the cartridge 15 of FIG. 4 may correspond to the processor 12, the first heater 13, the second heater 14, and the cartridge 15 of FIGS. 1 and 2, respectively. Thus, redundant descriptions thereof will be omitted.

Components relating to the present embodiment are shown in the aerosol generating device 1 illustrated in FIG. 4. Thus, it will be understood by those skilled in the art relating to the present embodiment that other general components than the components shown in FIG. 4 may be further included in the aerosol generating device 1.

The cartridge 15 may store an aerosol generating material. The aerosol generating material stored in the cartridge 15 may be, for example, a liquid composition.

The cartridge 15 may be detachably coupled to the main body 40. The main body 40 may include an accommodation space in which the cartridge 15 may be coupled to the main body 40. However, embodiments are not limited thereto, and the cartridge 15 may also be coupled to one side surface of the main body 40. When the cartridge 15 is coupled to the main body 40, the main body 40 and the cartridge 15 may be electrically connected to each other.

The first heater 13 may heat the cigarette 2 inserted into the aerosol generating device 1, and the second heater 14 may heat the aerosol generating material stored in the cartridge 15. The first heater 13 and the second heater 14 that are independent heaters may be individually operated by control of the processor 12.

The aerosol generating device 1 may heat only one of the aerosol generating material and the cigarette 2 stored in the cartridge 15 or may individually heat each of the aerosol generating material and the cigarette 2, thereby determining whether or not to generate visible smoke. The aerosol generating device 1 may be operated in one of a smokeless mode in which visible smoke is not generated and a smoke mode in which visible smoke is generated. The aerosol generating device 1 may generate aerosol in which visible smoke is not included, in the smokeless mode. Also, the aerosol generating device 1 may generate aerosol in which visible smoke is included, in the smoke mode. Even though aerosol is not generated according to the amount of atomization or a degree of saturation of materials included in the aerosol, visible smoke may be generated or not. Even though visible smoke is not generated (i.e., even in the smokeless mode), ingredients such as nicotine and flavor may be implemented.

The processor 12 may individually control the first heater 13 and the second heater 14 so that the aerosol generating device 1 may be operated in one of the smokeless mode and the smoke mode. For example, the processor 12 may control the battery 11 so that different amounts of power may be supplied to each of the first heater 13 and the second heater 14. A method of individually controlling the first heater 13 and the second heater 14 by using the processor 12 according to each mode will be described later with reference to FIGS. 5 and 6.

Also, the processor 12 may individually control the first heater 13 and the second heater 14, thereby controlling the amount of nicotine provided to the user. In an embodiment, only one of the first heater 13 and the second hater 14 may be operated so that a small amount of nicotine may be provided to the user compared to the case where both the first heater 13 and the second heater 14 are operated. In another embodiment, in order to provide the user with a largest amount of nicotine that the aerosol generating device 1 may provide, the processor 12 may control the first heater 13 and the second heater 14 so that the first heater 13 and the second heater 14 may be heated to a highest temperature settable for each of the first heater 13 and the second heater 14.

The aerosol generating device 1 may further include a user interface 70 that receives a user input for selecting at least one of a mode and a temperature profile. The processor 12 may control the first heater 13 and the second heater 14 in response to the user input. The user interface 70 will be described later with reference to FIGS. 7 and 8.

The aerosol generating device 1 may further include a sensor for detecting insertion of the cigarette 2. As insertion of the cigarette 2 is detected, the processor 12 may operate the first heater 13 and/or the second heater 14. A detailed operating method of the aerosol generating device 1 according to insertion of the cigarette 2 will be described later with reference to FIG. 10.

Figure 5:
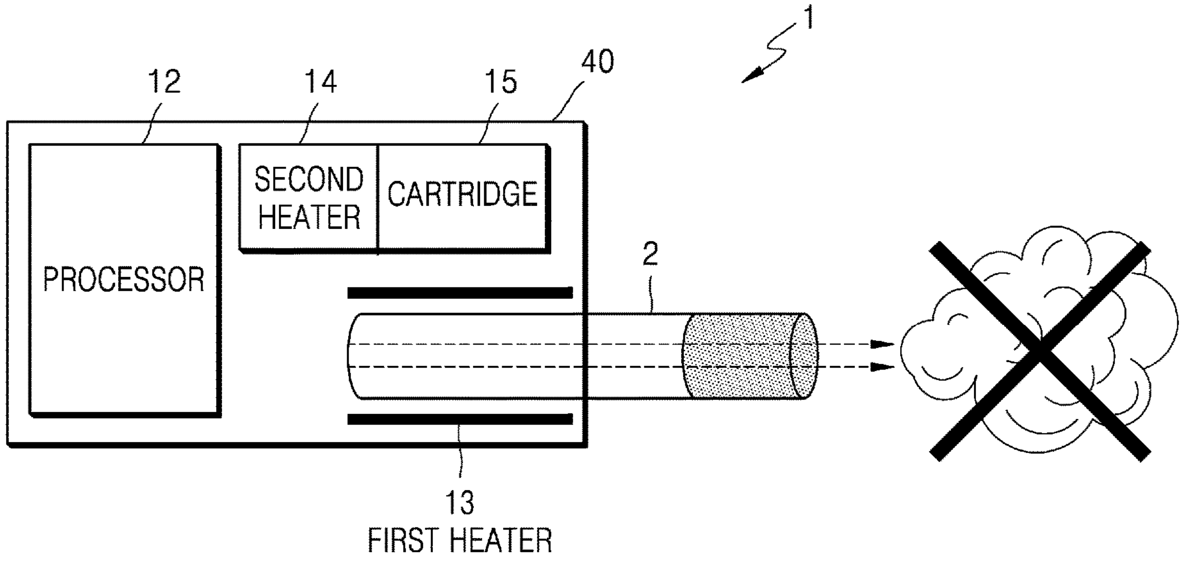
FIG. 5 is a view illustrating an aerosol generating device that operates in a smokeless mode according to an embodiment.

FIG. 5 is a view illustrating an aerosol generating device that operates in a smokeless mode according to an embodiment.

Referring to FIG. 5, the aerosol generating device 1 may include a processor 12, a first heater 13, a second heater 14, a cartridge 15, and a main body 40. Also, the cigarette 2 may be inserted into an internal space of the aerosol generating device 1.

The aerosol generating device 1 may not generate visible smoke in the smokeless mode and may generate an aerosol.

Visible smoke may be included in the aerosol generated as the aerosol generating material stored in the cartridge 15 is heated. The processor 12 may operate only the first heater 13 of the first heater 13 and the second heater 14 so that the aerosol generating material stored in the cartridge 15 is not generated in the smokeless mode. The processor 12 may operate only the first heater 13 to heat only the cigarette 2 of the aerosol generating material stored in the cartridge 15 and the cigarette 2.

In an embodiment, the processor 12 may operate only the first heater 13 of the first heater 13 and the second heater 14 in the smokeless mode and may control the first heater 13 so that the cigarette 2 may be heated to a temperature less than a first temperature. The first temperature that is a critical temperature at which visible smoke may be generated from the cigarette 2, and when the cigarette 2 is heated to the temperature less than the first temperature, visible smoke may not be generated from the cigarette 2, and when the cigarette 2 is heated to a temperature equal to or higher than the first temperature, visible smoke may be generated from the cigarette 2. The first temperature may be determined differently according to the type and composition ratio of materials included in the cigarette 2. The first temperature may be, for example, one of 100° C. and 150° C. However, this is just an example, and a value of the first temperature is not limited thereto.

As the cigarette 2 contains a pH adjuster or heat treatment is performed, a sufficient amount of nicotine may be released from the cigarette 2 in a smokeless mode in which the cigarette 2 is heated at a low temperature, compared to a smoke mode in which the cigarette 2 is heated to a temperature equal to or higher than the first temperature. Thus, even though the aerosol generating device 1 is operated in any mode of the smokeless mode and the smoke mode, a sufficient amount of nicotine may be released from the cigarette 2.

Figure 6:
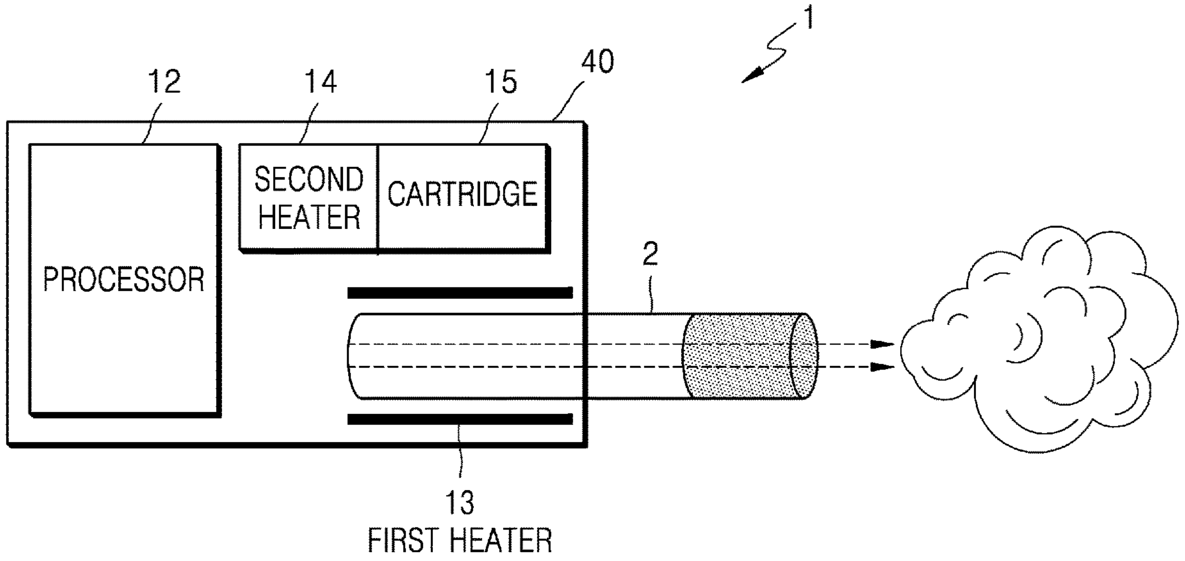
FIG. 6 is a view illustrating an aerosol generating device that operates in a smoke mode according to an embodiment.

FIG. 6 is a view illustrating an aerosol generating device that operates in a smoke mode according to an embodiment.

Referring to FIG. 6, an aerosol generating device 1 may include a processor 12, a first heater 13, a second heater 14, a cartridge 15, and a main body 40. Also, the cigarette 2 may be inserted into the internal space of the aerosol generating device 1.

The aerosol generating device 1 may generate aerosol in which visible smoke is included, in the smoke mode.

In an embodiment, the aerosol generating device 1 may heat the aerosol generating material included in the cartridge 15 in addition to the cigarette 2 in the smoke mode, thereby generating visible smoke from the aerosol generating material. The processor 12 may operate both the first heater 13 and the second heater 14 so that both the cigarette 2 and the aerosol generating material stored in the cartridge 15 may be heated. The processor 12 may control the second heater 14 so that the aerosol generating material stored in the cartridge 13 may be heated to a temperature equal to or higher than an evaporation point. Visible smoke may be included in the aerosol evaporated from the aerosol generating material.

In another embodiment, the processor 12 may control the first heater 13 so that the cigarette 2 may be heated to a temperature equal to or higher than the first temperature in the smoke mode, thereby generating visible smoke from the cigarette 2. Also, the processor 12 may control the first heater 13 and the second heater 14 so that the cigarette 2 may be heated to a temperature equal to or higher than the first temperature and the aerosol generating material stored in the cartridge 15 may be heated to a temperature equal to or higher than the evaporation point. In this case, visible smoke may be generated from both the aerosol generating material stored in the cartridge 15 and the cigarette 2, and a large amount of visible smoke may be generated compared to the case where visible smoke is generated from any one of the aerosol generating material stored in the cartridge 15 and the cigarette 2.

In another embodiment, the aerosol generating device 1 may heat only the aerosol generating material stored in the cartridge 15 from among the aerosol generating material stored in the cartridge 15 and the cigarette 2 in the smoke mode, thereby generating visible smoke. The processor 12 may operate only the second heater 14 of the first heater 13 and the second heater 14 and may control the second heater 14 so that the aerosol generating material stored in the cartridge 15 may be heated to a temperature equal to or higher than the evaporation point.

Figure 7:
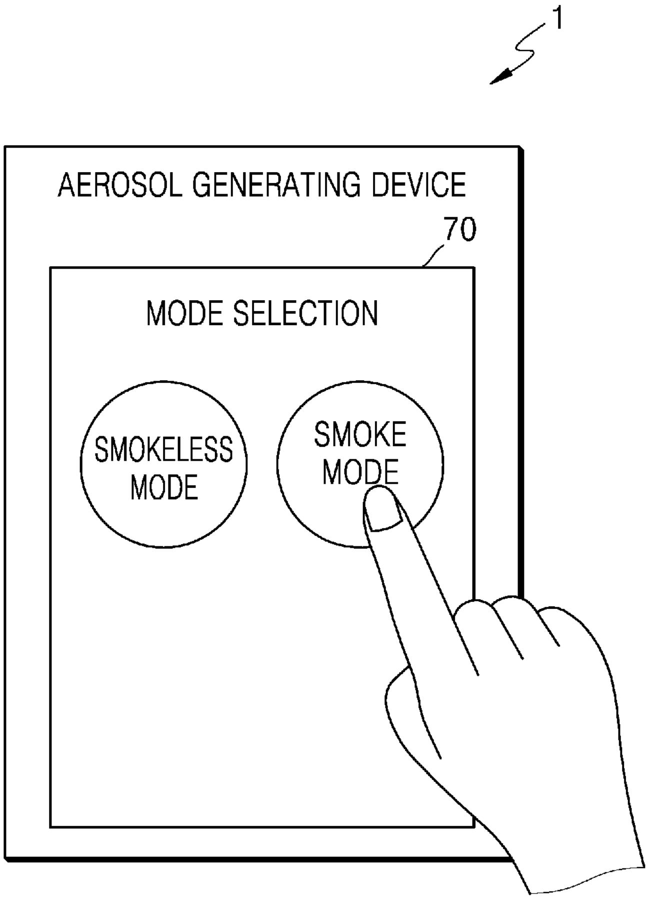
FIG. 7 is a view illustrating a user interface included in an aerosol generating device according to an embodiment.

FIG. 7 is a view illustrating a user interface included in an aerosol generating device according to an embodiment.

Referring to FIG. 7, an aerosol generating device 1 may include a user interface 70.

The user interface 70 may receive a user input. In an embodiment, the user interface 70 may include a display. For example, the user interface 70 may include a display on which icons corresponding to each of the smokeless mode and the smoke mode may be displayed. The display may be a touch screen or may operate while being electrically connected to an additional input unit.

In another embodiment, the user interface 70 may include a button. For example, the smokeless mode or the smoke mode may be selected through one button. The smokeless mode or the smoke mode may be selected according to the number of times one button is pressed or an input time continuously pressed. Also, the user interface 70 may include buttons corresponding to each of the smokeless mode and the smoke mode.

The user interface 70 may receive a first user input for selecting one of the smokeless mode and the smoke mode. The first user input that is distinguished from a second user input and a third user input to be described later, corresponds to a user input for selecting a mode of the aerosol generating device 1. The aerosol generating device 1 may operate in a mode selected according to the first user input.

The processor 12 may control the first heater 13 and the second heater 14 according to a previously-selected mode, in response to a third user input for generating an aerosol. The third user input corresponds to a user input for using the aerosol generating device 1, i.e., a user input for supplying power to a heater and generating aerosol. For example, the third user input may be insertion of the cigarette 2. An operating method of the aerosol generating device 1 according to insertion of the cigarette 2 will be described later with reference to FIG. 9.

In an embodiment, the processor 12 may control the first heater 13 and the second heater 14 according to the most recently selected mode, in response to the third user input. When there is an existing mode selected by the user, the processor 12 may control the first heater 13 and the second heater 14 according to the most recently selected mode even though mode selection is not accompanied each time there is a third user input.

In another embodiment, the processor 12 may control the first heater 13 and the second heater 14 only when mode selection is accompanied whenever there is a third user input. When a mode is not selected, the processor 12 may output a signal notifying the user to select a mode, in response to the third user input.

In another embodiment, the processor 12 may store a record on mode selection in memory. When the third user input and mode selection are accompanied, the processor 12 may operate according to the selected mode, and when there is no mode selection within a preset time after the third user input is performed, the processor 12 may operate according to a mode previously selected with a highest frequency.

Figure 8:
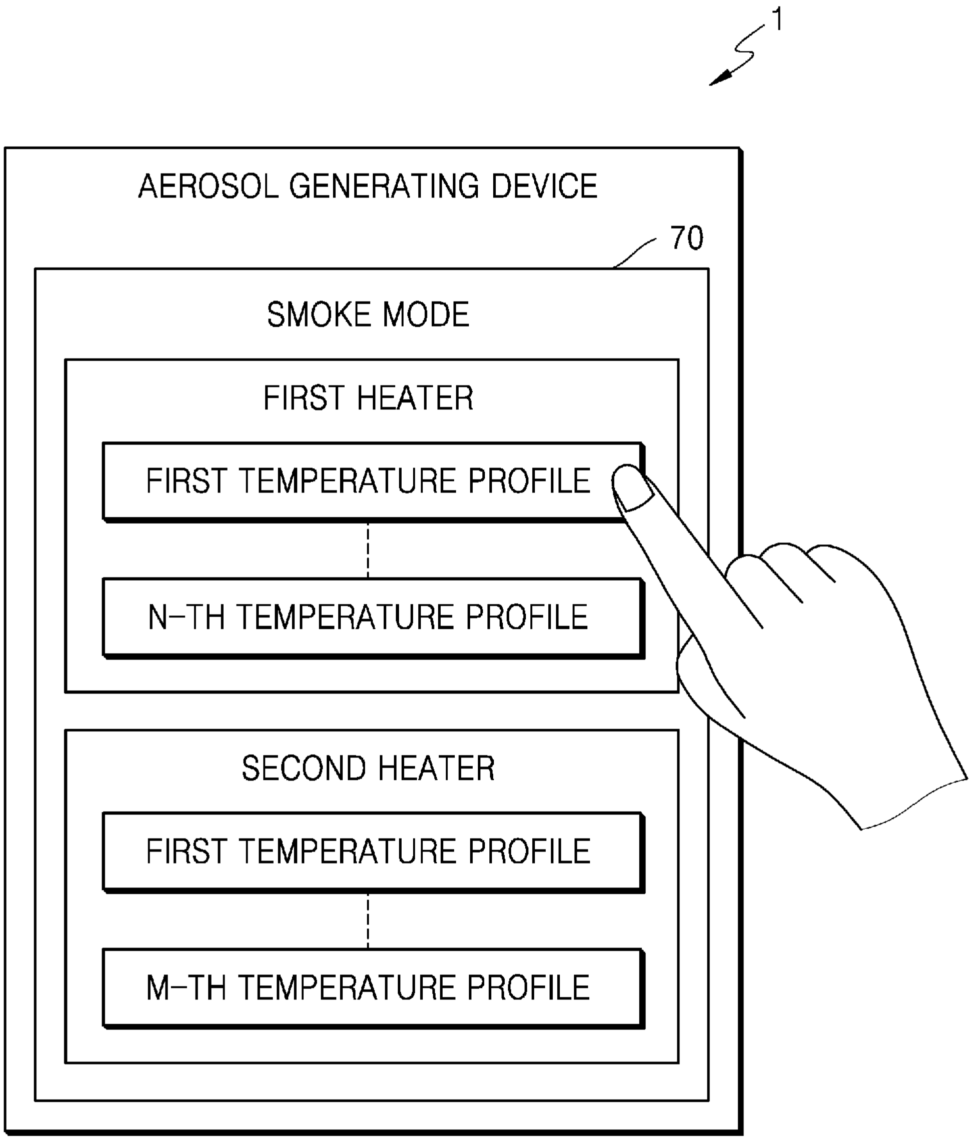
FIG. 8 is a view illustrating a user interface included in an aerosol generating device according to another embodiment.

FIG. 8 is a view illustrating a user interface included in an aerosol generating device according to another embodiment.

Referring to FIG. 8, an aerosol generating device 1 may include a user interface 70.

The user interface 70 may display icons corresponding to each of a plurality of temperature profiles corresponding to the selected mode within a region corresponding to the first heater 13 or the second heater 14, wherein N and M of FIG. 8 are natural numbers. The temperature profile refers to a temperature change of a heater over time. For example, the temperature profile may refer to a temperature change of a heater over time within one smoking operation.

The user interface 70 may receive a second user input for selecting the temperature profile. The second user input corresponds to a user input for selecting a temperature profile with respect to the first heater 13 or the second heater 14. The processor 12 may control the first heater 13 or the second heater 14 according to at least one selected temperature profile. The aerosol generating device 1 may provide different smoking experiences to the user according to the temperature profile at which a heater is heated. The processor 12 may control the heater according to the selected temperature profile, thereby providing an optimal smoking experience to the user within the selected mode.

When the smokeless mode is selected, the user interface 70 may receive a second user input for selecting one from among a plurality of temperature profiles within a first temperature range with respect to the first heater 13. The first temperature range that is a temperature range including temperature profiles with respect to the first heater 13 in the smokeless mode, corresponds to a temperature range less than a critical temperature at which visible smoke may be generated from the cigarette 2. The first temperature range may be differently determined according to the type and composition ratio of materials included in the cigarette 2. For example, the first temperature range may be a temperature range less than the first temperature, 100° C. or more and less than 150° C. However, this is just an example, and the first temperature range is not limited to the above-described example.

When the smoke mode is selected, the user interface 70 may receive a second user input for selecting one from among a plurality of temperature profiles within a second temperature range with respect to the first heater 13 and one from among a plurality of temperature profiles within a third temperature range with respect to the second heater 14. The second temperature range corresponds to a temperature range including temperature profiles with respect to the first heater 13 in the smoke mode, and the third temperature range corresponds to a temperature range including temperature profiles with respect to the second heater 14 in the smoke mode. When the first heater 13 and the second heater 14 are heated according to the temperature profile included in each of the second temperature range and the third temperature range, the second temperature range and the third temperature range may be set so that visible smoke may be generated from at least one of the aerosol generating material included in the cartridge 15 and the cigarette 2. For example, the second temperature range may be a temperature range including a temperature equal to or higher than the first temperature, and the third temperature range may be a temperature range including a temperature equal to or higher than the evaporation point of the aerosol generating material stored in the cartridge 15.

In an embodiment, when the temperature profile at which visible smoke is generated from the cigarette 2, is selected with respect to the first heater 13 in the smoke mode, the user interface 70 may receive a second user input for selecting not to operate the second heater 14. In another embodiment, when the temperature profile at which visible smoke is generated from the aerosol generating material stored in the cartridge 15, is selected with respect to the second heater 14 in the smoke mode, the user interface 70 may receive the temperature profile within the first temperature range or a second user input for selecting not to operate the first heater 13. In another embodiment, the user interface 70 may receive a second user input for selecting a temperature profile at which visible smoke is generated from both the aerosol generating material stored in the cartridge 15 and the cigarette 2, with respect to each of the first heater 13 and the second heater 14.

In another embodiment, at least one temperature profile may be generated by the user. At least one generated temperature profile may be displayed on the user interface 70 and selected by the second user input.

Figure 9:
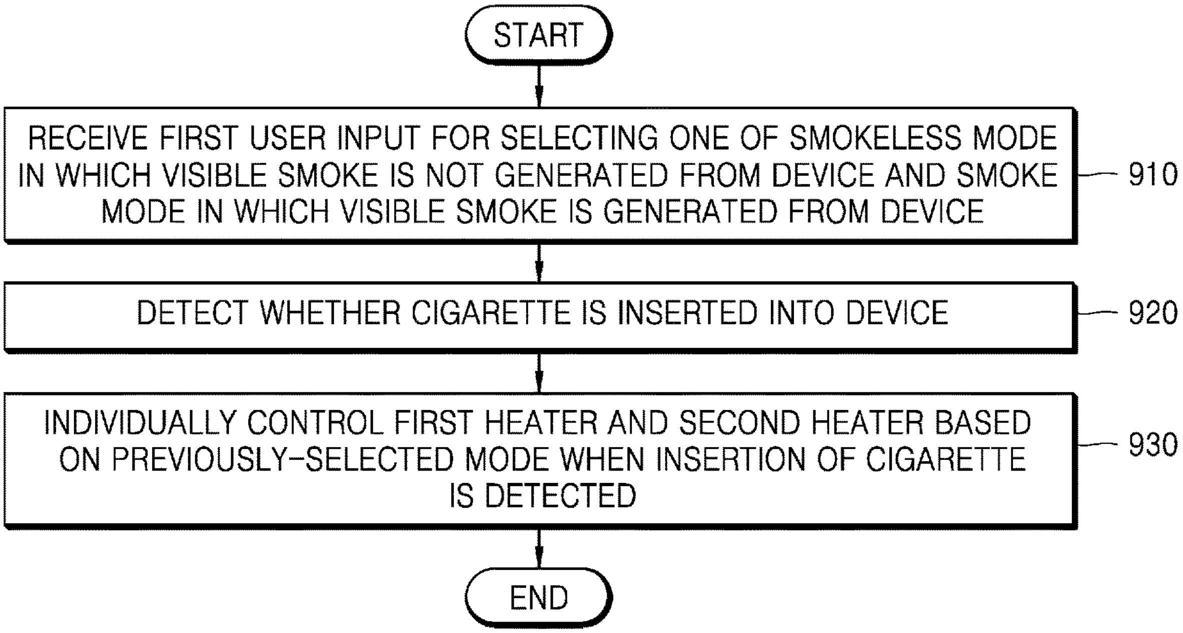
FIG. 9 is a flowchart illustrating an operating method of an aerosol generating device according to an embodiment.

FIG. 9 is a flowchart illustrating an operating method of an aerosol generating device according to an embodiment.

Referring to FIG. 9, an example of the operating method of the aerosol generating device 1 includes operations to be processed in a time series in the aerosol generating device 1 shown in FIG. 4. Thus, even though omitted below, the above-described contents about the aerosol generating device 1 shown in FIGS. 1 through 8 are also applied to the operating method of the aerosol generating device 1 of FIG. 1.

In operation 910, the aerosol generating device 1 may receive a first user input for selecting one of a smokeless mode in which visible smoke is not generated from the aerosol generating device 1, and a smoke mode in which visible smoke is generated from the aerosol generating device 1.

In an embodiment, when the smokeless mode is selected, the aerosol generating device 1 may receive a second user input for selecting one from among a plurality of temperature profiles within a first temperature range with respect to the first heater 13. When the smoke mode is selected, the aerosol generating device 1 may receive a second user input for selecting one from among a plurality of temperature profiles within the second temperature range with respect to the first heater 13 and one from among a plurality of temperature profiles within the third temperature range with respect to the second heater 14.

In operation 920, the aerosol generating device 1 may detect whether or not the cigarette 2 is inserted into the aerosol generating device 1.

A method of detecting insertion of the cigarette 2 by using the aerosol generating device 1 and a detailed operating method of the aerosol generating device 1 according to insertion of the cigarette 2 will be described later with reference to FIG. 10.

In operation 930, the aerosol generating device 1 may individually control the first heater 13 and the second heater 14 based on a previously-selected mode when insertion of the cigarette 2 is detected. The first heater 13 may heat the cigarette 2, and the second heater 14 may heat the aerosol generating material stored in the cartridge 15.

In an embodiment, when the smokeless mode is selected, the aerosol generating device 1 may operate only the first heater 13 of the first heater 13 and the second heater 14. The aerosol generating device 1 may control the first heater 13 so that the cigarette 2 may be heated less than the first temperature.

In another embodiment, when the smoke mode is selected, the aerosol generating device 1 may operate both the first heater 13 and the second heater 14. The aerosol generating device 1 may control the second heater 14 so that the aerosol generating material may be heated to a temperature equal to or higher than an evaporation point.

In another embodiment, when the smoke mode is selected, the aerosol generating device 1 may operate the first heater 13 and control the first heater 13 so that the cigarette 2 may be heated to a temperature equal to or higher than the first temperature.

In another embodiment, when the smoke mode is selected, the aerosol generating device 1 may operate only the second heater 14 of the first heater 13 and the second heater 14 and control the second heater 14 so that the aerosol generating material may be heated to a temperature equal to or higher than the evaporation point.

In another embodiment, the aerosol generating device 1 may control the first heater 13 and the second heater 14 according to at least one temperature profile selected by the second user input.

When the aerosol generating device 1 operates in the smokeless mode, the user may use the aerosol generating device 1 without restriction of place or environment. Also, when the aerosol generating device 1 operates in the smoke mode, the aerosol generating device 1 may provide visual satisfaction to the user.

Figure 10:
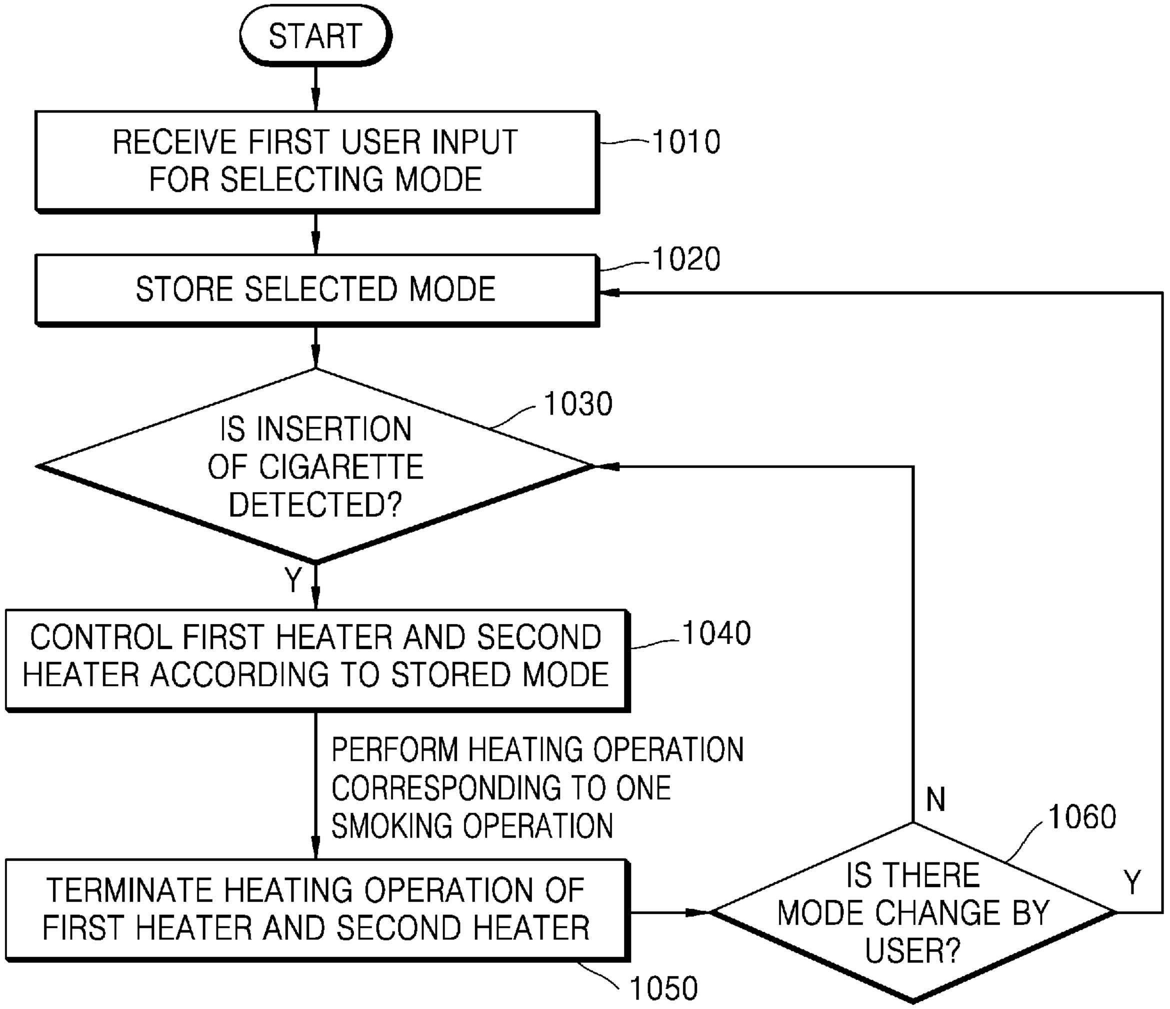
FIG. 10 is a flowchart illustrating an operating method of an aerosol generating device based on insertion of a cigarette according to an embodiment.

FIG. 10 is a flowchart illustrating an operating method of an aerosol generating device based on insertion of a cigarette according to an embodiment.

Referring to FIG. 10, an example of the operating method of the aerosol generating device 1 includes operations to be processed in a time series in the aerosol generating device 1 shown in FIG. 4. Thus, even though omitted below, the above-described contents about the aerosol generating device 1 shown in FIGS. 1 through 8 are also applied to the operating method of the aerosol generating device 1 of FIG. 10.

In operation 1010, the aerosol generating device 1 may receive a first user input for selecting a mode.

In operation 1020, the aerosol generating device 1 may store the selected mode in memory.

In operation 1030, the aerosol generating device 1 may detect whether the cigarette 2 is inserted into the aerosol generating device 1.

The aerosol generating device 1 may include a sensor for detecting insertion of the cigarette 2. The sensor may be located in an internal space of the aerosol generating device 1 into which the cigarette 2 is inserted. The sensor may correspond to, for example, an inductance sensor, an optical sensor, a sensor for detecting mechanical changes, or a capacitive sensor. When the sensor is an inductance sensor, the sensor may generate an electrical signal corresponding to inductance that varies when the cigarette 2 is inserted into the aerosol generating device 1. The aerosol generating device 1 may detect insertion of the cigarette 2 based on the electrical signal generated by the sensor. The aerosol generating device 1 may perform operation 1040 when insertion of the cigarette 2 is inserted.

In operation 1040, the aerosol generating device 1 may control the first heater 13 and the second heater 14 according to the mode stored in operation 1020.

In operation 1050, the aerosol generating device 1 may terminate a heating operation of the first heater 13 and the second heater 14 and may perform operation 1060.

In operation 1060, the aerosol generating device 1 may perform operation 1030 when there is no mode change by the user, operation 1030 may be performed, and when insertion of the cigarette 2 is detected in operation 1030, the aerosol generating device 1 may perform operation 1040. For example, when there is a first user input for selecting the same mode as a previously-stored mode or insertion of the cigarette 2 is detected without an additional first user input, the aerosol generating device 1 may perform operation 1040. In operation 1040, the aerosol generating device 1 may control the first heater 13 and the second heater 14 according to the previously-stored mode.

In operation 1060, the aerosol generating device 1 may perform operation 1020 when there is a mode change by the user. For example, when there is the first user input for selecting a different mode from the previously-stored mode, the aerosol generating device 1 may perform operation 1020 and may store the mode selected in operation 1060 in the memory. In operation 1030, when insertion of the cigarette 2 is detected, the aerosol generating device 1 may perform operation 1040 and control the first heater 13 and the second hater 14 according to the most recently stored mode.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
a main body to which a cartridge is detachably coupled, wherein the main body comprises:
a first heater configured to heat a cigarette inserted into the aerosol generating device;
a second heater configured to heat an aerosol generating material stored in the cartridge; and
a processor configured to:
individually control the first heater and the second heater so that the aerosol generating device operates in either a smokeless mode in which only the first heater is operated and visible smoke is not generated, or a smoke mode in which visible smoke is generated; and
control a battery to supply power to both the first heater and the second heater in the smoke mode.

2. The aerosol generating device of claim 1, wherein the processor is further configured to control the first heater so that the cigarette is heated to a temperature less than a first temperature, the first temperature being a temperature at which visible smoke is generated.

3. The aerosol generating device of claim 1, wherein the processor is further configured to control the second heater so that the aerosol generating material is heated to a temperature equal to or higher than an evaporation point.

4. The aerosol generating device of claim 1, wherein, in the smoke mode, the processor is further configured to control the first heater so that the cigarette is heated to a temperature equal to or higher than a first temperature, the first temperature being a temperature at which visible smoke is generated.

5. The aerosol generating device of claim 1, wherein, in the smoke mode, the processor is further configured to control the second heater so that the aerosol generating material is heated to a temperature equal to or higher than an evaporation point.

6. The aerosol generating device of claim 1, further comprising:
a user interface configured to receive a first user input for selecting one of the smokeless mode and the smoke mode,
wherein the processor is further configured to control the first heater and the second heater according to a previously-selected mode, in response to a second user input for generating an aerosol.

7. The aerosol generating device of claim 6, wherein,
when the smokeless mode is selected, the user interface is configured to receive a third user input for selecting one from among a plurality of temperature profiles within a first temperature range with respect to the first heater,
when the smoke mode is selected, the user interface is further configured to receive a fourth user input for selecting one from among a plurality of temperature profiles within a second temperature range with respect to the first heater and one from among a plurality of temperature profiles within a third temperature range with respect to the second heater, and
the processor is further configured to control the first heater and the second heater according to the selected at least one temperature profile.

8. The aerosol generating device of claim 6,
wherein the main body comprises an internal space with a sensor configured to detect insertion of the cigarette, and
wherein the processor is further configured to detect insertion of the cigarette based on a signal generated by the sensor, and when insertion of the cigarette is detected, control the first heater and the second heater according to a previously-selected mode.

9. The aerosol generating device of claim 1, wherein the processor is further configured to control an amount of nicotine provided to the user, by individually controlling the first heater and the second heater.

10. An operating method of an aerosol generating device, comprising:

receiving a first user input for selecting either a smokeless mode in which visible smoke is not generated from the aerosol generating device or a smoke mode in which visible smoke is generated from the aerosol generating device;

detecting whether a cigarette is inserted into the aerosol generating device; and when insertion of the cigarette is detected, individually controlling a first heater and a second heater based on a previously-selected mode, wherein in the smokeless mode, only the first heater is operated, wherein the first heater heats the cigarette, and the second heater heats an aerosol generating material stored in a cartridge, and wherein power is supplied, by a battery, to both the first heater and the second heater in the smoke mode.

11. The operating method of claim 10, wherein the controlling comprises:

operating only the first heater among the first heater and the second heater when the smokeless mode is selected.

12. The operating method of claim 10, wherein the receiving of the first user input comprises:

when the smokeless mode is selected, receiving a second user input for selecting one from among a plurality of temperature profiles within a first temperature range with respect to the first heater; and when the smoke mode is selected, receiving a third user input for selecting one from among a plurality of temperature profiles within a second temperature range with respect to the first heater and one from among a plurality of temperature profiles within a third temperature range with respect to the second heater, and wherein the controlling comprises controlling the first heater and the second heater according to the selected at least one temperature profile.

* * * * *